July 23, 1957 — W. H. MOORHEAD — 2,800,526
SELF-LOCKING FLEXIBLE GROMMET

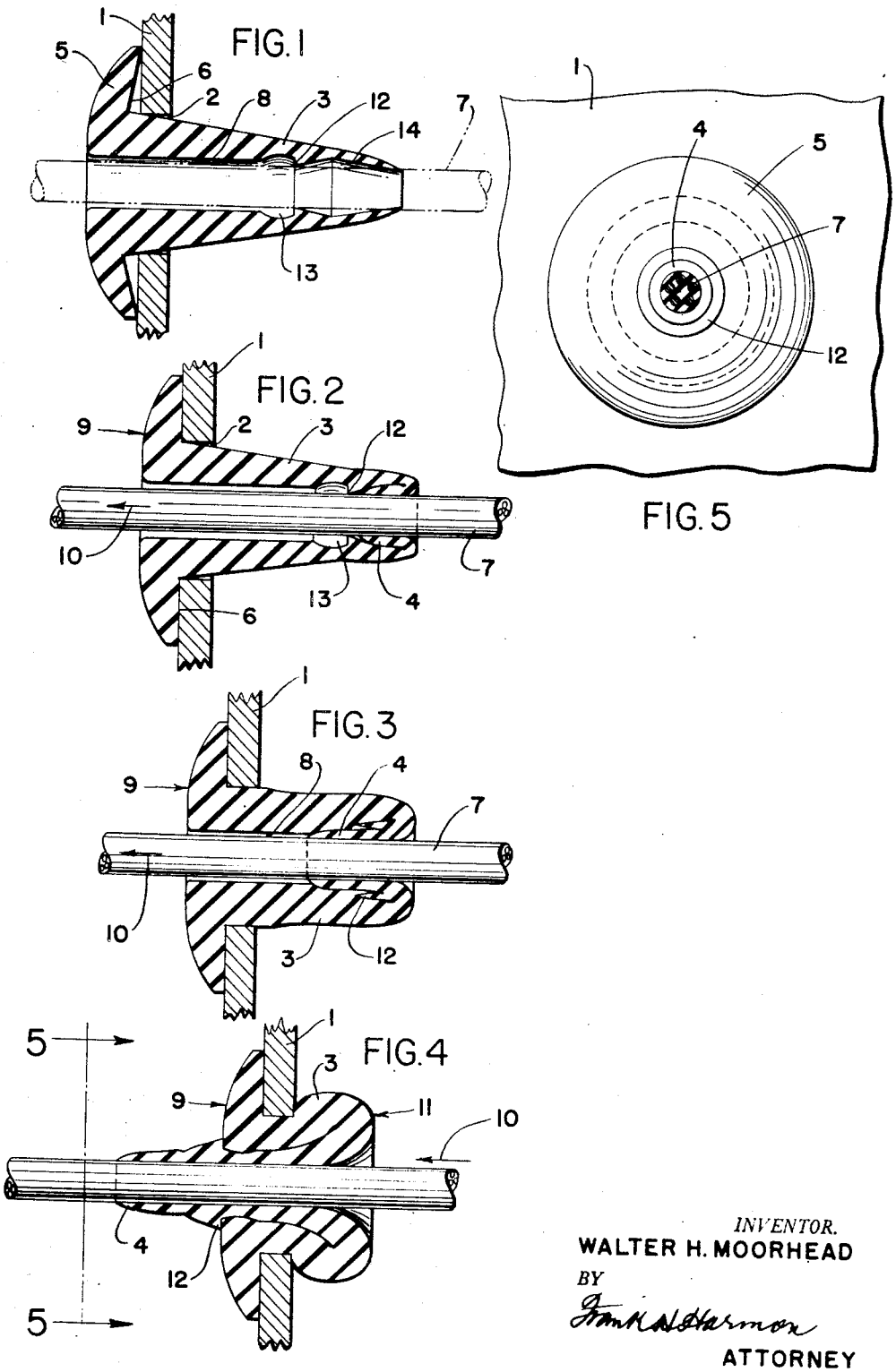

Filed Sept. 30, 1954 — 2 Sheets-Sheet 2

INVENTOR.
WALTER H. MOORHEAD
BY
ATTORNEY

United States Patent Office 2,800,526
Patented July 23, 1957

2,800,526
SELF-LOCKING FLEXIBLE GROMMET

Walter H. Moorhead, Richmond Heights, Ohio

Application September 30, 1954, Serial No. 459,500

2 Claims. (Cl. 174—153)

This invention relates to improvements in flexible grommets and has for one of its primary objects to provide a simple, inexpensive and efficient grommet that is universal in its application.

Another object is to privde a grommet that may more readily be inserted and removed, with respect to a wall member, through which it extends and also in some applications with respect to an electric cord, or other member, which it carries and which it serves to protect from the wall member.

Another object is to provide a flexible hollow grommet with a pre-formed single flared head and an elongated hollow body portion, which latter may be readily inserted through a hole in the wall, the wall thickness and the inside diameter of the end portion of the hollow body portion being so predetermined that the end portion is adapted to frictionally and resiliently grip an elongated member so that while holding the flared head against the wall while forcing the elongated member through the grommet in a direction toward the flared head, the end of the body portion will turn inwardly to extend through the flared head and the major portion of the length of the body portion will roll inwardly upon itself to form another flared head on the other side of the wall opposite to the pre-flared head, regardless of whether the elongated member is a tool or a member, such as an electric cord, is employed.

A further object is to provide the body portion with a ridge, which, when the end of the body portion is forced through the pre-flared head, will resiliently snap into such a position as to form a resilient lock against its displacement, as well as displacement of the second flared head formed during such operation of forming the second flared head of the grommet.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in section taken through the grommet and a wall member through which the elongated body portion of the grommet is extending, showing the pre-flared head in abutment with one side of the wall and, in side elevation, an elongated member extending through the hollow grommet, the grommet being shown in its normal undistorted condition;

Figure 2 is a view similar to Figure 1, showing the elongated member having been moved slightly to the left, in the direction of the arrow, and the end portion, due to its resilient frictional gripping relationship with the elongated member, being reversed inwardly on itself and carried linearly toward the wall member;

Figure 3 is a similar view showing the next stage of operation caused by further movement of the elongated member toward the left, showing the initial stage of the main body portion starting to roll inwardly on itself to eventually form a flared head;

Figure 6:
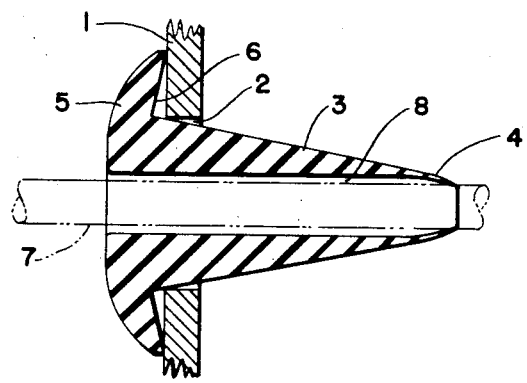
Figure 7:
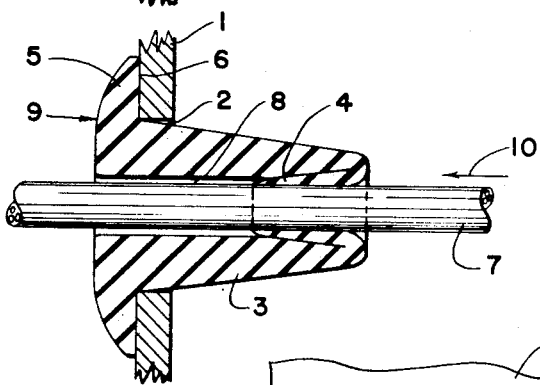
Figures 8, 9:
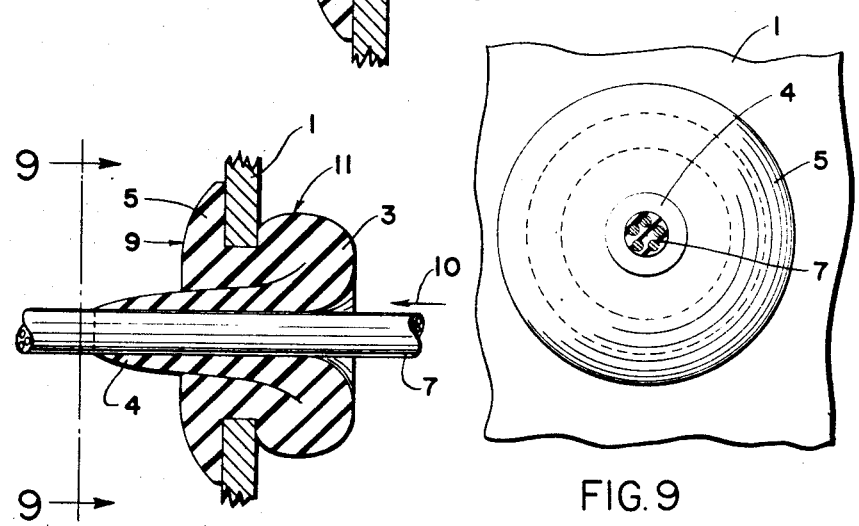

Figure 4 is a similar view, showing the final stage of operation, showing the end of the body portion extending outwardly through the pre-flared head and the internal ridge of the body portion adjacent the end portion, now turned inside out to become an external ridge and in abutment with the outer surface of the pre-flared head and in overlapping relationship with respect to the hole in the pre-flared head to form a lock against removal, and the body portion having rolled inwardly upon itself to form a second head on the opposite side of the wall to complete a two-headed grommet;

Figure 5 is a view in section taken along line 5—5 of Figure 4;

Figure 6 is a view similar to Figure 1 of a modified form a grommet that is not provided with a locking ridge;

Figure 7 is a view similar to Figure 2, showing the type of grommet employed in Figure 6;

Figure 8 is a view similar to Figure 4, showing the type of grommet employed in Figures 6 and 7; and Figure 9 is a view of section taken along line 9—9 of Figure 8.

Referring more particularly to the drawings, I have shown in Figure 6 a wall member 1, apertured at 2 to receive the main body portion 3 and end portion 4 of a hollow grommet made of flexible deformable material including a pre-flared head 5 in abutment with the left side surface of the wall member 1, the inside surface 6 of the head 5 being preferably dished to be concave. Extending through the hollow grommet is shown an elongated member 7. The inside diameter of the hollow grommet is preferably such as to have a bore 8, the major portion of its length receiving member 7 with radial clearance and the end portion 4 being in resilient frictional engagement with member 7.

With the assembly in the position of Figure 6, when pressure is exerted on the head 5 in the direction of the arrow 9 against the wall 1, while simultaneously moving the member 7 in the direction of the arrow 10, as shown in Figure 2, the end portion 4, in its resilient frictional engagement with the member 7, first becomes turned inside out to assume the position shown in Figure 7, while the concave surface 6 of head 5 becomes flattened against wall 1. In addition, the thus reversed end portion 4 in Figure 7 filled up the bore 8 while the remainder of bore 8 still provides radial clearance between the grommet and member 7.

Further forcing of member 7 in the direction of arrow 10 while pressure is still applied to head 5 in the direction of arrow 9 against wall 1 results in the end portion protruding through head 5 while the main body portion 3 has been rolled inwardly upon itself to form a second head, generally indicated at 11, on the right side of wall 1 to complete a two-heated grommet, as shown in Figure 8. This also results in completely filling the aperture 2 in wall 1 to effect a snug engagement. The end portion 4, in assuming the position of Figure 8, has appreciably expanded the bore of the head 5 to insure against inadvertent disassembly of the parts from their respective positions of Figure 8, while permitting intentional forceful disassembly when desired. Merely as a specific instance of utility, the wall 1 may be considered as a panel and member 7 an insulated electric cable. Thus, the grommet is readily insertable from left to right, as shown in Figure 6, and the second head 11 formed on the right side of wall 1 and locked in position by the end portion 4 extending through the head 5, as shown in Figure 8, all without necessitating any physical access to the right side of the wall 1.

While the locking effect of end portion 4 in its position of Figure 8 should be sufficient for all practical purposes, there may be some instances where additional precautionary locking means would be considered advisable. I have shown a preferred embodiment of such an additional locking means in Figures 1 to 4, inclusive.

Referring to Figure 1, I have modified the internal bore of the grommet to include an annular ridge 12 between two enlarged recesses 13 and 14.

Referring to Figure 2, when pressure is applied to head 5 in the direction of arrow 9 while member 7 is forced in the direction of arrow 10, the end portion 4, due to its resilient gripping relationship with member 7, first becomes turned inside out and is carried in the direction of arrow 10 so as to fill the gap of recess 14 located to the right of the annular ridge 12.

As shown in Figure 3, further movement of member 7 to the left in the direction of arrow 10 carries end portion 4 past the annular ridge 12 to fill the gap provided by recess 13 located normally to the left of ridge 12.

As shown in Figure 4, continued movement of member 7 to the left in the direction of arrow 10 causes the end portion 4 to protrude through head 5 to a position where the normally inside annular ridge 12 is turned inside out to become an external annular ridge bearing against head 5 in overlapping relationship to the bore of head 5 to constitute a locking means against inadvertent disassembly, while permitting intentional forceful disassembly when desired.

In connection with either of the two disclosed forms of grommets, it is to be understood that while member 7 is illustrated as an insulated electric cable and wall member 1 as a panel, the wall 1 and member 7 are to be considered in the broadest sense. Moreover, the member 7 may be the member carried by the grommet and also may be considered as a tool for forming the second head of the grommet, after which the tool is withdrawn and the member to eventually be carried by the grommet subsequently inserted in the thus formed two-headed grommet.

Thus, it will be seen that I have provided a new and novel hollow grommet provided with a single preformed flared head and an elongated body portion readily insertable through an apertured wall, the main body portion being so designed as the removably receive an elongated member in resilient frictional gripping relationship with radial clearance between the member and the main body portion, so that upon application of pressure on the head against the wall and forcible movement of the elongated member in the opposite direction, the end portion becomes turned inside out and carried to protrude through the head to become locked against displacement while the main body portion rolls inwardly on itself to form a second head on the side of the wall opposite the preformed flared head.

I claim:

1. A hollow grommet of flexible deformable material comprising a preformed enlarged end head and an elongated hollow body portion insertable through an aperture in a wall member so that the inner face of said preformed enlarged end head abuts the outer side of said wall member about said aperture therein, the hollow grommet being adapted to receive an elongated member that extends through said grommet with radial clearance in said preformed enlarged end head and the greater portion of its elongated body portion, the smaller end of said grommet being of such predetermined inside diameter as to be in resilient frictional gripping relationship with said elongated member, the smaller end portion of the grommet also having an internal annular flange spaced from the smaller end toward said preformed enlarged end head and the bore of said hollow body portion, whereby, upon forcible movement of said elongated member in a direction away from the smaller end of said grommet toward said preformed larger end head, the smaller end of the grommet, due to its gripping relationship with said elongated member, is adapted to be reversed upon itself so that movement of said elongated member causes the smaller end and the internal flange to both be drawn through the hollow preformed head, turning the internal flange into an external flange to position it against the outer face of said preformed head to be locked thereagainst against removal in the opposite direction, and the main body portion is adapted to be rolled inwardly upon itself progressively toward said preformed larger end head to form a second enlarged grommet head on the inner side of said apertured wall member opposite that of said preformed enlarged end head and also flexibly deform said elongated grommet body into snug engagement with said element and said wall member in the aperture of said wall member.

2. A hollow grommet of flexible deformable material comprising a preformed enlarged end head and an elongated hollow body portion insertable through an aperture in a wall member so that the inner face of said preformed enlarged end head abuts the outer side of said wall member about said aperture therein, the hollow grommet being adapted to receive an elongated member that extends through said grommet with radial clearance in said preformed enlarged end head and the greater portion of its elongated body portion, the smaller end of said grommet being of such predetermined inside diameter as to be in resilient frictional gripping relationship with said elongated member, the smaller end portion of the grommet also having an internal annular flange spaced from the smaller end toward said preformed enlarged end head and the bore of said hollow body portion having enlarged recesses on each side of said internal flange, whereby, upon forcible movement of said elongated member in a direction away from the smaller end of said grommet toward said preformed larger end head, the smaller end of the grommet, due to its gripping relationship with said elongated member, is adapted to be reversed upon itself to fill up one recess and force the internal flange radially outwardly to provide space for the smaller portion of the grommet to continue to move into the second recess, and upon further movement of said elongated member the smaller end and the internal flange are both adapted to be drawn through the hollow preformed head, turning said internal flange into an external flange to position it against the outer face of said preformed head to be locked thereagainst against removal in the opposite direction, and the main body portion is adapted to be rolled inwardly upon itself progressively toward said preformed larger end head to form a second enlarged grommet head on the inner side of said apertured wall member opposite that of said preformed enlarged end head and also flexibly deform said elongated grommet body into snug engagement with said element and said wall member in the aperture of said wall member.

References Cited in the file of this patent

UNITED STATES PATENTS 2,707,723    Moorhead _____ May 3, 1955